(12) United States Patent
Kottmeier, Jr. et al.

(10) Patent No.: US 10,580,072 B2
(45) Date of Patent: Mar. 3, 2020

(54) SYSTEM AND METHOD FOR PROVIDING A CREDIT CARD WITH MULTIPLE CREDIT LINES

(71) Applicant: CAPITAL ONE FINANCIAL CORPORATION, McLean, VA (US)

(72) Inventors: Robert Arthur Kottmeier, Jr., Arlington, VA (US); Scott Barton, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 104 days.

(21) Appl. No.: 15/866,812

(22) Filed: Jan. 10, 2018

(65) Prior Publication Data
US 2018/0130128 A1 May 10, 2018

Related U.S. Application Data

(60) Continuation of application No. 13/969,755, filed on Aug. 19, 2013, now abandoned, which is a
(Continued)

(51) Int. Cl.
*G06Q 40/02* (2012.01)
*G06Q 20/10* (2012.01)
(Continued)

(52) U.S. Cl.
CPC ........... *G06Q 40/025* (2013.01); *G06Q 20/10* (2013.01); *G06Q 20/40* (2013.01); *G06Q 40/00* (2013.01); *G06Q 40/08* (2013.01)

(58) Field of Classification Search
CPC ...... G06Q 20/405; G06Q 20/10; G06Q 20/20; G06Q 20/40; G06Q 40/00; G06Q 40/025; G06Q 40/08
(Continued)

(56) References Cited

U.S. PATENT DOCUMENTS

| 4,443,027 A | 4/1984 | McNeely et al. |
| 5,025,138 A | 6/1991 | Cuervo |

(Continued)

OTHER PUBLICATIONS

First USA, CyberMark to issue first publicly-available U.S. dual-function Credit/Smart card for florida state university. (Sep. 17, 1998) . Business Wire Retrieved from http://dialog.proquest.com/professional/docview/667229245?accountid=142257 retrieved on Oct. 4, 2019 (Year: 1998).*

(Continued)

*Primary Examiner* — Kito R Robinson
(74) *Attorney, Agent, or Firm* — Finnegan, Henderson, Farabow, Garrett & Dunner, LLP

(57) ABSTRACT

A system and method for providing a credit card with multiple lines of credit. One of the disclosed methods include, for example, analyzing credit information of a cardholder to determine a level of risk associated with the cardholder; establishing a general purpose credit line based on the determined level of risk associated with the cardholder, the general purpose credit line being set as a revolving credit line; establishing a private label credit line based on the determined level of risk associated with the cardholder, the private label credit line being set as a revolving credit line; and issuing the credit card to the cardholder with the established general purpose credit line and private label credit line.

20 Claims, 7 Drawing Sheets

Related U.S. Application Data continuation of application No. 11/998,417, filed on Nov. 30, 2007, now Pat. No. 8,560,440, which is a division of application No. 09/659,585, filed on Sep. 11, 2000, now Pat. No. 7,406,442.

(51) Int. Cl.
  *G06Q 20/40* (2012.01)
  *G06Q 40/00* (2012.01)
  *G06Q 40/08* (2012.01)

(58) Field of Classification Search
  USPC .......................................................... 705/38
  See application file for complete search history.

(56) References Cited

U.S. PATENT DOCUMENTS

| | | | |
|---|---|---|---|
| 5,239,462 A | 8/1993 | Jones et al. | |
| 5,477,040 A * | 12/1995 | Lalonde | G06Q 20/4037 235/375 |
| 5,530,232 A | 6/1996 | Taylor | |
| 5,546,523 A * | 8/1996 | Gatto | G06Q 20/10 235/379 |
| 5,590,038 A * | 12/1996 | Pitroda | G06Q 20/02 705/41 |
| 5,732,136 A * | 3/1998 | Murphree | G06Q 20/085 235/379 |
| 5,732,400 A * | 3/1998 | Mandler | G06Q 20/02 705/26.44 |
| 5,734,838 A | 3/1998 | Robinson et al. | |
| 5,774,882 A | 6/1998 | Keen et al. | |
| 6,000,608 A * | 12/1999 | Dorf | G06Q 20/341 235/375 |
| 6,105,009 A * | 8/2000 | Cuervo | G06Q 20/00 235/375 |
| 6,119,103 A | 9/2000 | Basch et al. | |
| 6,158,657 A * | 12/2000 | Hall, III | G06Q 20/341 235/379 |
| 6,254,000 B1 * | 7/2001 | Degen | G06Q 20/347 235/379 |
| 6,332,133 B1 * | 12/2001 | Takayama | G06Q 20/04 235/380 |
| 6,422,462 B1 | 7/2002 | Cohen | |
| 6,434,238 B1 * | 8/2002 | Chaum | G06Q 20/341 380/30 |
| 6,615,189 B1 | 9/2003 | Phillips et al. | |
| 6,715,679 B1 * | 4/2004 | Infosino | G06Q 20/105 235/380 |
| 6,915,277 B1 * | 7/2005 | Manchester | G06Q 20/10 705/39 |
| 7,103,579 B1 * | 9/2006 | Phillips | G06Q 20/0425 705/1.1 |
| 7,356,506 B2 | 4/2008 | Watson | |
| 7,472,090 B1 * | 12/2008 | White | G06Q 20/10 705/35 |
| 7,774,274 B2 * | 8/2010 | Jones | G06Q 20/10 705/39 |
| 8,600,869 B1 * | 12/2013 | Rotman | G06Q 20/4037 705/35 |
| 2001/0034676 A1 * | 10/2001 | Vasic | G06Q 10/10 705/30 |
| 2002/0095386 A1 * | 7/2002 | Maritzen | G06Q 20/04 705/64 |
| 2002/0116341 A1 * | 8/2002 | Hogan | G06Q 20/04 705/64 |
| 2002/0120584 A1 * | 8/2002 | Hogan | G06Q 20/02 705/67 |
| 2002/0138428 A1 * | 9/2002 | Spear | G06Q 10/0875 705/41 |
| 2002/0147669 A1 | 10/2002 | Taylor et al. | |
| 2002/0156723 A1 * | 10/2002 | Lilly | G06Q 20/10 705/38 |
| 2003/0009393 A1 * | 1/2003 | Norris | G06Q 20/20 705/14.27 |
| 2003/0204470 A1 * | 10/2003 | Manchester | G06Q 20/10 705/39 |
| 2003/0208438 A1 * | 11/2003 | Rothman | G06Q 40/02 705/38 |
| 2004/0010462 A1 * | 1/2004 | Moon | G06Q 20/04 705/39 |
| 2004/0083184 A1 * | 4/2004 | Tsuei | G06Q 10/08 705/74 |
| 2004/0117300 A1 * | 6/2004 | Jones | G06Q 20/10 705/39 |
| 2006/0224454 A1 * | 10/2006 | Kantor | G06Q 30/02 705/14.3 |
| 2007/0267479 A1 * | 11/2007 | Nix | G06Q 20/10 235/379 |
| 2008/0010154 A1 * | 1/2008 | Tietzen | G06Q 30/02 705/14.17 |
| 2008/0249813 A1 * | 10/2008 | Schmeyer | G06Q 10/02 705/5 |
| 2009/0254463 A1 * | 10/2009 | Tomchek | G06Q 20/12 705/30 |
| 2014/0279008 A1 * | 9/2014 | Calman | G06Q 30/0215 705/14.58 |

OTHER PUBLICATIONS

Block, Valerie, "Norwest Unit Adds Twists to Cobranding Combination Card Plan Seen as Alternative to Private Labels," American Banker, Jun. 15, 1994, vol. 159, issue 114, p. 12.

Value Pay Solicitation Materials, including credit card application and disclosure materials, Feb. 1999, 6 pages.

Value One Catalog, Feb. 1999, 64 pages including cover and end page of catalog.

Block, Valerie, American Banker (pre-1997 Fulltext) [New York, N.Y] Jun. 15, 1994.

* cited by examiner

SYSTEM AND METHOD FOR PROVIDING A CREDIT CARD WITH MULTIPLE CREDIT LINES

CROSS-REFERENCE TO RELATED APPLICATIONS

This is a continuation of U.S. patent application Ser. No. 13/969,755, filed Aug. 19, 2013, which is a continuation of U.S. patent application Ser. No. 11/998,417, filed Nov. 30, 2007, now U.S. Pat. No. 8,560,440, issued Oct. 15, 2013, which is a division of U.S. patent application Ser. No. 09/659,585, filed Sep. 11, 2000, now U.S. Pat. No. 7,406,442, issued Jul. 29, 2008. The disclosures of the above-referenced applications are all expressly incorporated herein by reference in their entireties.

BACKGROUND OF THE INVENTION

I. Field of the Invention

The present invention generally relates to credit card products and to systems and methods for offering and providing such products. More particularly, the invention relates to systems and methods that provide a credit card product with more than one credit line, such as a credit card with a general purpose credit line and a private label credit line.

II. Background and Material Information

Credit card products have become so universally well known and ubiquitous that they have fundamentally changed the manner in which financial transactions and dealings are viewed and conducted in society today. Credit card products are most commonly represented by plastic card-like members that are offered and provided to customers through credit card issuers (such as banks and other financial institutions). With a credit card, an authorized customer or cardholder is capable of purchasing services and/or merchandise without an immediate, direct exchange of cash. With each purchase, the cardholder incurs debt which the cardholder may thereafter pay upon receipt of a monthly or otherwise periodic statement. In most cases, the cardholder will have the option to either fully pay the outstanding balance or, as a matter of necessity or choice, defer at least a portion or the balance for later payment with accompanying interest or finance charges for the period during which payment of the outstanding debt is deferred (also referred to as a revolving charge credit line).

The spending power of a credit card (i.e., the total amount of funds available to the cardholder at any particular time for making purchases) is typically limited to a particular amount that is predetermined by the issuer of the card. This amount is commonly referred to as the "credit limit" of the credit card. The credit limit provides the cardholder with a line of credit (also referred to as a credit line). The size of the issuer-imposed credit limit is generally based on a number of non-exclusive factors, the most important of which are often the cardholder's earning capacity and the cardholder's credit history. When purchases are made or debts incurred with the credit card, the available portion of the credit limit is reduced by the purchase or debt amounts. In addition, interest and/or finance charges are also subtracted from the available portion of the credit limit on a periodic basis. The total debits on a credit card are referred to as the "outstanding balance," while the remaining or available balance of the credit limit is typically called the "available balance" and reflects the dynamically adjusted current spending power of the credit card. The cardholder may increase the available balance up to the credit limit, by paying the outstanding balance to the issuer.

Credit card issuers (such as banks and other financial institutions) usually provide general purpose credit cards that may be used for a plurality of different goods and services and with a wide variety of merchants. For example, a Visa, MasterCard, American Express, Dinner's Club are examples of general purpose credit cards. Since general purpose credit cards are intended for "general use" by a cardholder, they are typically not associated with a single merchant or limited in use.

Some credit card issuers or merchants issue private label credit cards (e.g., a Sears Charge Card) for use exclusively with a merchant's goods and/or services. Such private label credit cards may be issued to customers of the merchant to provide an incentive to purchase the goods and/or services of the merchant. Private label credit cards may be issued with different types of terms and conditions. For example, a private label credit card may include a private label credit line with a predetermined credit limit and the possibility of deferring payment on an outstanding balance with a finance or interest charge (e.g., a revolving credit line). A private label credit card may also include a charge account that requires the cardholder to pay the balance in full at the end of each month or the card may include an installment line of credit where the cardholder is required to make a fixed, periodic payment to the merchant (or the merchant's representative) until the installment debt is paid.

Private label credit cards have several disadvantages. For example, the credit line of a private label credit card may only be used to make purchases in connection with the merchant's goods and/or services. As a result, a private label credit card limits a customer's overall use of the credit card. Moreover, if the private label credit card includes a charge account that requires full payment of the outstanding balance at the end of the month, the cardholder tends to limit use of the merchant's credit card to an amount that can be paid at the end of the month. The same is also true for private label credit cards that have an installment line of credit, since a cardholder will tend to limit purchases from the merchant to only those that qualify for an installment type credit purchase (e.g., purchases for a major appliance, such as a dish washer or oven).

SUMMARY OF THE INVENTION

Accordingly, the present invention is directed to systems and methods for providing an improved credit card product, and, more particularly, to providing a credit card product with multiple lines of credit.

Systems and methods consistent with the principles of the present invention provide a credit card with multiple lines of credit that eliminate the need for a consumer to have a separate general purpose and private label credit card. Systems and methods consistent with the present invention increase the convenience and use of a credit card by providing the credit card with multiple lines of credit.

According to one aspect of the invention, a dual line credit card is provided with two revolving lines of credit (e.g., a general purposed credit line and a private label credit line). The dual line credit card of the present invention makes it more convenient for a cardholder to make revolving charge credit purchases and permits revolving credit charges for a wide variety of goods and services. Further, merchants benefit from the features of the invention since cardholders are more likely to increase the frequency of use of the dual line credit card when compared to the other types of credit cards.

According to another aspect of the invention, multiple lines of credit are embedded into a credit line associated with a credit card product. The embedded credit lines may permit the cardholder to make revolving credit charges for a wide variety of goods and services. The embedded credit lines may include different types of the credit lines (e.g., a general purpose credit line and a private label credit line) that provide an incentive to the cardholder to make purchases with specific merchant(s) or to make general purchases for a wide variety of goods and/or services. Additional features and advantages of the invention will be set forth in part in the description which follows and in part will be obvious from the description, or may be learned by practice of the invention. The objectives and advantages of the invention may be realized and attained by the system and method particularly pointed out in the written description and claims hereof as well as the appended drawings.

To achieve these and other advantages and in accordance with the purpose of the invention, as embodied and broadly described herein, there is provided a method for providing a credit card, the method including, for example, analyzing credit information of a cardholder to determine a level of risk associated with the cardholder; establishing a general purpose credit line based on the determined level of risk associated with the cardholder, the general purpose credit line being set as a revolving credit line; establishing a private label credit line based on the determined level of risk associated with the cardholder, the private label credit line being set as a revolving credit line; and issuing the credit card to the cardholder with the established general purpose credit line and private label credit line.

According to another embodiment of the present invention, there is provided a method for providing a credit card, the method including, for example, receiving credit information for a cardholder; analyzing the received credit information to determine a level of risk associated with the cardholder; establishing a general purpose credit line based on the level of risk associated with the cardholder that is part of the private label credit line; establishing a private label credit line that is a revolving credit line based on the level of risk associated with the cardholder; and issuing the credit card to the cardholder with the established general purpose credit line and the established private label credit line.

According to yet another embodiment of the present invention, there is provided a method for authorizing a purchase made with a merchant using a credit card, wherein the credit card includes a general purpose credit line and a private label credit line, the method including, for example, determining whether the purchase is to be applied against the private label credit line or against the general purpose credit line; authorizing the purchase against the private label credit line when it is determined that the purchase is a private label purchase; and authorizing the purchase against the general purpose credit line when it is determined that the purchase is a general purpose purchase.

Furthermore, according to another embodiment of the present invention, there is provided a computer program product for providing a credit card, the computer program product comprising computer-readable media including computer-readable code, the computer program product including the following computer-readable program code for effecting actions in a computing platform: program code for analyzing credit information of a cardholder to determine a level of risk associated with the cardholder, program code for establishing a general purpose credit line based on the determined level of risk associated with the cardholder, the general purpose credit line being set as a revolving credit line; program code for establishing a private label credit line based on the determined level of risk associated with the cardholder, the private label credit line being set as a revolving credit line; and program code for issuing the credit card to the cardholder with the established general purpose credit line and private label credit line.

According to still yet another embodiment of the present invention, there is provided a computer program product for providing a credit card, the computer program product comprising computer-readable media having computer-readable code, the computer program product including the following computer-readable program code for effecting actions in a computing platform: program code for receiving credit information for a cardholder program code for analyzing the received credit information to determine a level of risk associated with the cardholder; program code for establishing a general purpose credit line based on the level of risk associated with the cardholder that is part of the private label credit line; program code for establishing a private label credit line that is a revolving credit line based on the level of risk associated with the cardholder; and program code for issuing the credit card to the cardholder with the established general purpose credit line and the established private label credit line.

According to yet another embodiment of the present invention, there is provided a computer program product for authorizing a purchase made with a merchant using a credit card, wherein the credit card includes a general purpose credit line and a private label credit line, the computer program product comprising computer-readable media having computer-readable code, the computer program product including the following computer-readable program code for effecting actions in a computing platform: program code for determining whether the purchase is to be applied against the private label credit line or against the general purpose credit line; program code for authorizing the purchase against the private label credit line when it is determined that the purchase is a private label purchase; and program code for authorizing the purchase against the general purpose credit line when it is determined that the purchase is a general purpose purchase.

According to yet another embodiment of the present invention, there is provided a system for providing a credit card including, for example, means for analyzing credit information of a cardholder to determine a level of risk associated with the cardholder; means for establishing a general purpose credit line based on the determined level of risk associated with the cardholder, the general purpose credit line being set as a revolving credit line; means for establishing a private label credit line based on the determined level of risk associated with the cardholder, the private label credit line being set as a revolving credit line; and means for issuing the credit card to the cardholder with the established general purpose credit line and private label credit line.

Furthermore, in yet another embodiment of the present invention, there is provided a system for providing a dual line credit card including, for example, means for receiving credit information for a cardholder; means for analyzing the received credit information to determine a level of risk associated with the cardholder, means for establishing a general purpose credit line based on the level of risk associated with the cardholder that is part of the private label credit line; means for establishing a private label credit line that is a revolving credit line based on the level of risk associated with the cardholder and means for issuing the credit card to the cardholder with the established general purpose credit line and the established private label credit line.

According to an additional embodiment of the present invention, there is provided a system for authorizing a purchase made with a merchant using a credit card, wherein the credit card comprises a general purpose credit line and a private label credit line, the system including, for example, means for determining whether the purchase is to be applied against the private label credit line or against the general purpose credit line; means for authorizing the purchase against the private label credit line when it is determined that the purchase is a private label purchase; and means for authorizing the purchase against the general purpose credit line when it is determined that the purchase is a general purpose purchase.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, illustrate various embodiments and aspects of the present invention and, together with the description, explain the principles of the invention. In the drawings.

DETAILED DESCRIPTION

Figure 1:
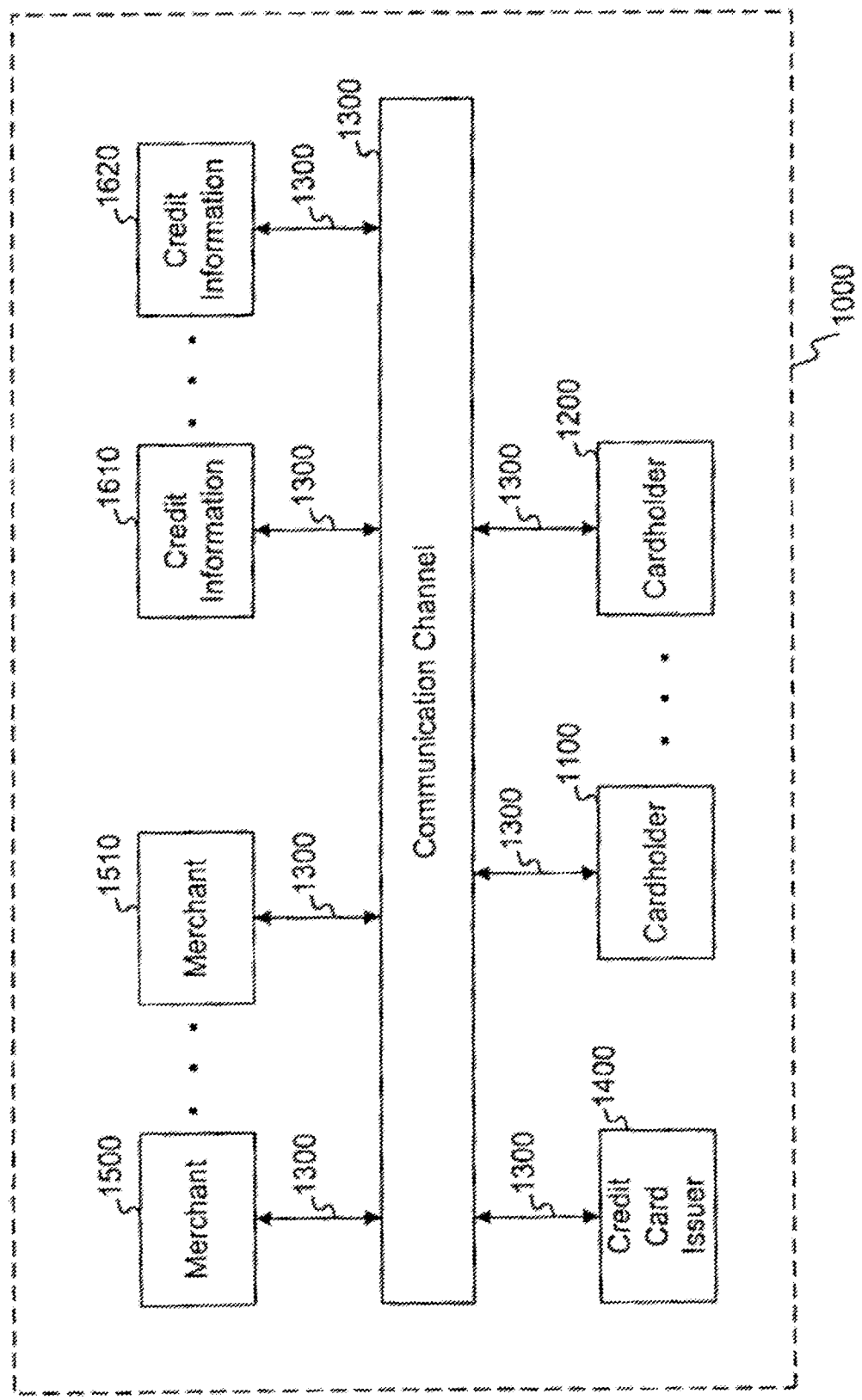
FIG. 1 illustrates an exemplary system environment in which the features and principles of the present invention may be implemented.

Reference will now be made in detail to the invention, examples of which are illustrated in the accompanying drawings. Wherever possible, the same reference numbers will be used throughout the drawings to refer to the same or like parts.

Generally, the present invention is directed to a system and method for providing a credit card with multiple lines of credit. In accordance with one embodiment of the present invention, a credit card is implemented as a dual line credit card. The dual line credit card may include, for example, a private label credit line and a general purpose credit line. Both the private label credit line and the general purpose credit line may be revolving credit lines. A merchant or credit card issuer may provide the dual line credit card to individuals to permit charges with the private label credit line for only the merchant's goods and/or services. The general purpose credit line may also be provided to permit purchases for a variety of goods and/or services from merchants that accept the general purpose credit line.

The dual line credit card of the present invention permits a cardholder or consumer to carry only a single credit card that can be used both as a general credit card and as a merchant's private label credit card. Moreover, with the dual line credit card of the present invention, merchants may offer special incentives to customers that use the private label credit line (such as zero percent interest) without affecting the terms of the general purpose credit line (such as the prevailing interest rate). Also, because only a single account statement is provided, the cardholder is advantageously provided with a combined statement of the charges provided under the private label credit line and under the general credit line.

The present invention also relates to systems and methods for providing a credit card with multiple lines of credit, wherein one or more lines of credit (such as a general purpose credit line) is embedded into a main line of credit (such as a private label line of credit). Each embedded credit line may permit the cardholder to make revolving credit charges for a wide variety of goods and services. The embedded credit lines may include, for example, different types of the credit lines (e.g., general purpose credit lines), with the main line of credit (e.g., the private label line of credit) providing an incentive to the cardholder to make purchases with specific merchant(s). Each embedded credit line (i.e., a general purpose credit line) may have a maximum credit limit that is equal to or less than the maximum credit limit for the main line of credit (i.e., the private label credit line). Any charge to the embedded credit line may cause a dollar-for-dollar reduction in the amount of available credit for the main credit line. For example, with a main credit line that is established as a private label credit line of $6,000, and an embedded credit line that is established as a general purposed credit line of $4,000, charges applied to the general purpose credit line will reduce the available credit under the private label credit line. For instance, a $1,500 charge to the general purpose credit line will reduce the available credit under the private label credit line by $1,500 to $4,500 (assuming there are no other outstanding charges). Such a charge will also reduce the available credit under the general purpose credit line by $1,500 to $2,500.

The above-noted features and other aspects and principles of the present invention may be implemented in various environments. Such environments and related applications may be specially constructed for performing the various processes and operations of the invention or they may include a general purpose computer or computing platform selectively activated or reconfigured by program code to provide the necessary functionality. The processes disclosed herein are not inherently related to any particular computer or other apparatus, and may be implemented by a suitable combination of hardware, software, and/or firmware. For example, various general purpose machines may be used with programs written in accordance with teachings of the invention, or it may be more convenient to construct a specialized apparatus or system to perform the required methods and techniques.

The present invention also relates to computer readable media that include program instruction or program code for performing various computer-implemented operations based on the methods and processes of the invention. The media and program instructions may be those specially designed and constructed for the purposes of the invention, or they may be of the kind well-known and available to those having skill in the computer software arts. Examples of program instructions include for example machine code, such as produced by a compiler, and files containing a high level code that can be executed by the computer using an interpreter.

FIG. 1 illustrates an exemplary system environment 1000 in which the features and principles of the present invention may be implemented. As illustrated in FIG. 1, the system environment 1000 includes one or more merchants 1500, 1510, one or more sources of credit information sources 1610, 1620, and one or more cardholders 1100, 1200. A credit card issuer 1400 is also provided for issuing and providing the credit card product of the invention. In addition, a communications channel 1300 is provided to facilitate communication and transactions between the various entities depicted in FIG. 1.

In the exemplary embodiment of FIG. 1, credit card issuer 1400 is responsible for providing and issuing credit card products with multiple lines of credit (such as a dual line card). Credit card issuer 1400 may include one or more of the following: a bank, a merchant bank, a merchant or any commercial institution capable of providing a credit card consistent with the features disclosed herein. Further, although FIG. 1 only illustrates one credit card issuer 1400, it is of course possible that more than one credit card issuer be provided for the purposes of issuing and clearing charges made with the credit card product of the present invention.

Cardholders 1100, 1200 are issued credit cards by the credit card issuer 1400. Cardholders 1100, 1200 may include, for example, one or more of the following: an individual, a business, and/or any entity capable of using the credit card of the present invention. Once a credit card is issued to a cardholder, the cardholder may make purchases or other financial transactions with merchants 1500, 1510 using the credit card, as further explained below.

Credit information sources 1610, 1620 are sources that provide credit information to credit card issuer 1400. Credit information of an individual is provided to credit card issuer 1400 when a credit card application is evaluated and processed for any of the cardholders 1100, 1200. Credit information may include credit history information and/or personal information (e.g., income, employment status, etc.) that is used when evaluating an individual's credit worthiness. Credit information sources 1610, 1620 may comprise commercial credit information source (such as TRW/Experian, Equifax and TransUnion or a similar commercial credit service bureau) and/or private credit information services. Credit information sources 1610, 1620 may also represent credit information that is provided by an individual, such as when a consumer applies for a credit card.

Merchants 1500, 1510 shown in FIG. 1 may include one or more merchants that offer goods and/or services to consumers. Each merchant may be a specific merchant of goods and/or services associated with a private label credit line of the present invention. Merchants 1500, 1510 may also include one or more merchants that offer goods and/or services that can be purchased through the general purpose credit line of the invention. In general, cardholders 1100, 1200 may make purchases from merchants 1500, 1510 with credit cards, including credit cards of the present invention that have multiple lines of credit.

As indicated above, communication-channel 1300 facilitates communication between the various entities illustrated in FIG. 1. Such communication includes communication related to applying and issuing credit cards, making purchases with a credit card and resolving or settling charges made with a credit card. Communications channel 1300 may include, for example, a telephony-based network, a local area network (LAN), a wide area network (WAN), a dedicated intranet, the Internet, and/or a wireless network. Further, any suitable combination of wired and/or wireless components and systems may be incorporated into communications channel 1300. Any suitable combination of point-to-point communications or networked communications may also be incorporated into communication channel 1300 to facilitate communication between the entities illustrated in FIG. 1. Moreover, any part of communication channel 1300 may implemented through traditional infrastructures or channels of trade, to permit credit card applications, purchases and/or settlements to be performed manually or in-person by the various entities illustrated in FIG. 1.

To issue a credit card according to the principles of the present invention, credit card issuer 1400 may identify potential cardholders and provide offers to the potential cardholders. A potential cardholder (e.g., 1100) may respond to the offer and submit application information directly to the credit card issuer 1400 thorough communications channel 1300. Alternatively, application information for a credit card may be submitted to credit card issuer 1400 through one of the merchants 1500, 1510.

To evaluate each credit card application, credit card issuer 1400 receives credit information from one or more credit information sources 1610, 1620. The received credit information is analyzed along with other application information to determine the credit worthiness or a level of risk associated with each potential cardholder. If the potential cardholder has sufficient credit, credit card issuer 1400 may approve the application and issue the credit card to the new cardholder. In accordance with the present invention, each credit card is preferably issued with multiple lines of credit. For example, the credit card may be issued as a dual line credit card with two revolving lines of credit, including a general purpose credit line and a private label credit line. The credit card may also be issued with embedded credit lines, as discussed above. Each embedded credit line may include several different types of credit lines, such as a general purpose credit line and a private label credit line.

The lines of credit for the credit card may be established based on the credit information received for each individual. For example, the credit card issuer may establish a general purpose credit line and a private label credit line for the credit card, wherein each credit line is a revolving credit line that is set based on the level of risk associated with the cardholder. Each credit line may have terms and conditions (e.g., interest rate, late fees, etc.) that are unique or similar to the terms and conditions of other credit lines of the credit card.

Alternatively, the credit card may be issued with an embedded credit line. For instance, the credit card issuer may establish a main credit line that is established as a private label credit line that includes one or more embedded credit lines (e.g., a general purpose credit line), wherein the credit lines function as revolving lines of credit. Each credit line may be set based on the level of risk associated with the cardholder. For example, if a credit card is issued with a main credit line of $8,000, the embedded credit line may be established with a credit line of $2,000.

In the embodiment of FIG. 1, cardholder (e.g., 1100) may use the issued credit card with one or more merchants 1500, 1510 to make a purchase. When the cardholder (e.g., 1100) utilizes the credit card of the present invention to make a purchase with a merchant (e.g., 1500), merchant 1500 seeks authorization for the purchase amount from the credit card issuer 1400. Merchant 1500 may communicate with credit card issuer 1400 through communications channel 1300 to provide purchase information (e.g., the purchase amount, the credit card number, and the merchant identification number) and to seek authorization for the purchase. Alternatively, the merchant may connect to a bank's credit card authorization system (not shown) that is capable of authorizing the purchase with the credit card. During authorization, the purchase may be analyzed to determine which credit line the purchase is to be applied to. For example, credit card issuer 1400 may determine whether the purchase is to be applied to a private label credit line or a general purpose credit line of the credit card. Credit card issuer 1400 may authorize a purchase against the private label credit line when it is determined that the purchase is against the private label credit line and that the private label credit line includes sufficient credit to satisfy the purchase. Alternatively, credit card issuer 1400 may authorize the purchase against the general purpose credit line when it is determined that the purchase is against the general purpose credit line and that the general purpose credit line includes sufficient credit to satisfy the purchase.

To determine whether the purchase is against the private label credit line or against the general purpose credit line, various techniques may be implemented. For example, credit card issuer 1400 may analyze a number associated with the credit card (e.g., a BIN number or the first six digits of the credit card) and/or compare the merchant identification number received from the merchant to a list of stored merchant identification numbers. The stored merchant identification numbers may represent merchants providing a private label credit line with the credit card of the present invention. Accordingly, if the comparison of the received merchant identification number and the stored merchant identification number yields a match, the purchase may be determined to be applied against the private label credit line of the credit card. If the received merchant identification number does not match one of the stored merchant identification numbers, the purchase may be determined to be applied against the general purpose credit line of the credit card.

The BIN number that is received from the merchant may be used as an index to locate a unique account record for the cardholder. The account record for the cardholder may be stored in memory and include various account information related to the cardholder's credit card. This account information may include, for example, the type and amount of each credit line that is established for the credit card, as well as valid merchant identification numbers for each credit line. Account status information (e.g., outstanding balance, available credit, last payment, etc.) may also be stored in the cardholder's account record.

During authorization, the cardholder's account record may be located based on the BIN number provided by the merchant. The retrieved account record may then be analyzed to determine what credit lines exist for the credit card and the available credit for each credit line. For example, to authorize a charge to a private label credit line, the cardholder's account record may be analyzed to determine if a private label credit line is established and whether there is sufficient credit to charge the purchase amount against the private label credit line. Also, the merchant identification number received from the merchant may be compared with a merchant identification number stored in the cardholder's account record to determine if the private label purchase was made with a qualifying or valid merchant. Authorization for charges against a general purpose credit line may be handled in a similar fashion using the account record information for the cardholder to verify the existence of the general purpose credit line and the existence of sufficient credit. Also, to verify that the merchant identification number is valid, the merchant identification number received from the merchant may be compared with merchant identification numbers stored in the cardholder's account record in association with the general purpose credit line to determine if the general purpose purchase was made with a qualifying or valid merchant. Alternatively, the merchant identification number received from the merchant may be compared with merchant identification numbers stored in a master record for all cardholders to determine if the general purpose purchase was made with a qualifying or valid merchant.

After a purchase has been made and, preferably, after authorization has been granted, merchant may settle the purchase amount made with the credit card of the present invention. To request settlement, the merchant may send or transmit purchase information to the credit card issuer 1400 through communication channel 1300 or may send purchase information to a third party, such as a bank, that is capable of settling charges made with the credit card of the present invention.

For purposes of illustration, assume that credit card issuer 1400 in FIG. 1 issues a dual line card to one of the cardholders 1100, 1200. The dual line card may include, for example, two revolving credit lines; namely, a general purpose credit line and a private label credit line. The private label credit line represents a revolving line of credit for use only with a specific merchant's goods and services. The general purpose credit line represents a revolving credit line that may be used with a wide variety of merchants and that is not limited to a single merchant's goods and services.

In this example, credit card issuer 1400 may establish the lines of credit for the dual line credit card by determining the level of risk associated with the cardholder. This may be performed by calculating, for example, a risk score that provides an estimate of the risk of nonpayment by the cardholder. The risk score may be computed by analyzing credit information for the cardholder, including the cardholder's credit history and application Information. Credit card issuer 1400 may utilize the risk score to establish the general purpose credit line for the cardholder. In addition, credit card issuer 1400 may establish the private label credit line based on one or more factors, including for example: the risk score of the cardholder; the types of goods and/or services provided by the merchant associated with the private label credit line; and the average or expected purchase amount of good and/or services purchased from the merchant. As further disclosed herein, such factors may be applied in various ways (including the use of a line sloping model) to determine and set the private label credit line. Other factors (such as purchasing habits of the cardholder, the credit history of the cardholder with the merchant, and the credit limit established for the general purpose credit line) may be used by the credit card issuer to set the private label credit line.

Returning to the above-noted example of FIG. 1, assume that credit card issuer 1400 determines to issue a dual line credit card to cardholder 1100 with a $1200 general purpose credit line and a $500 private label credit line. This enables cardholder 1100 to charge $500 with the private label credit line and charge $1200 against the general purpose credit line. Charges made to the private label credit line may be limited to only charges from the merchant sponsoring the private label credit line. Charges made to the general purpose credit line, however, may include charges with any merchant, including charges from the merchant sponsoring the private label credit line. Accordingly, the cardholder is provided with more available credit and more flexibility for making charges with the dual line credit card of the present invention.

In above-noted example of FIG. 1, assume that a $200 purchase is made by the cardholder with the dual line credit card issued by credit card issuer 1400. To seek authorization for the purchase from the credit card issuer 1400, the merchant (e.g., merchant 1500) may seek authorization through communications channel 1300 by submitting the purchase amount, BIN number, and merchant identification number. Credit card issuer 1400 then compares, for example, the received merchant identification number to stored merchant identification numbers and determines whether the $200 purchase is against the private label credit line associated with merchant 1500. Credit card issuer 1400 may also analyze the BIN number to determine the credit limits and status of the dual line credit card issued to the cardholder. If, for example, if the $200 purchase can not be applied against the private label credit line (e.g., due to insufficient credit or a non-qualifying purchase), credit card issuer 1400 may deny the purchase or apply the purchase against the general purpose credit line (assuming sufficient credit exists). If the charge is approved, merchant 1500 may then seek settlement for the authorized purchase by requesting settlement through credit card issuer 1400, which results in a posting of $200 against the private label credit line or general label credit line of cardholder 1100, and a credit for the merchant 1500 in the amount of $200.

If, in the above-noted example of FIG. 1, cardholder 1100 makes a purchase for $200 against the general purpose credit line, merchant (e.g., merchant 1510) may seek authorization from credit card issuer 1400 for the $200 purchase through communications channel 1300. In such a case, merchant 1510 may submit the purchase amount, BIN number, and merchant identification number to credit card issuer 1400. Credit card issuer 1400 then uses the received merchant identification number and received BIN number to determine whether cardholder 1400 has sufficient credit to make the purchase against the general purpose credit line. If the cardholder's general purpose credit line can satisfy the $200 purchase and there is no private label credit line with merchant 1510, credit card issuer 1400 may authorize the $200 purchase against the general purpose credit line. Merchant 1510 may then seek settlement for the $200 by requesting settlement through credit card issuer 1400, which results in a posting of $200 against the cardholder's 1100 general purpose credit line and a $200 credit for merchant 1510.

As indicated above, other types of credit cards with multiple lines of credit may be issued and used in connection with the exemplary environment of FIG. 1. For example, credit card issuer 1400 may issue a credit card with a main credit line and one or more embedded credit lines to cardholders 1100, 1200. Each embedded credit line may include different types of credit, including general purpose credit lines. Each of the embedded credit lines may be set based on the level of risk associated with the cardholder and embedded into the main credit line of the credit card. For example, if a cardholder is approved to have a $1200 private label credit line as a main credit line, then the credit card could be issued with a $600 general purpose credit line as the embedded credit line. This would permit the cardholder to make up to $1,200 in private label purchases, or up to $600 general purpose purchases and up to $600 private label purchases.

Figure 2:
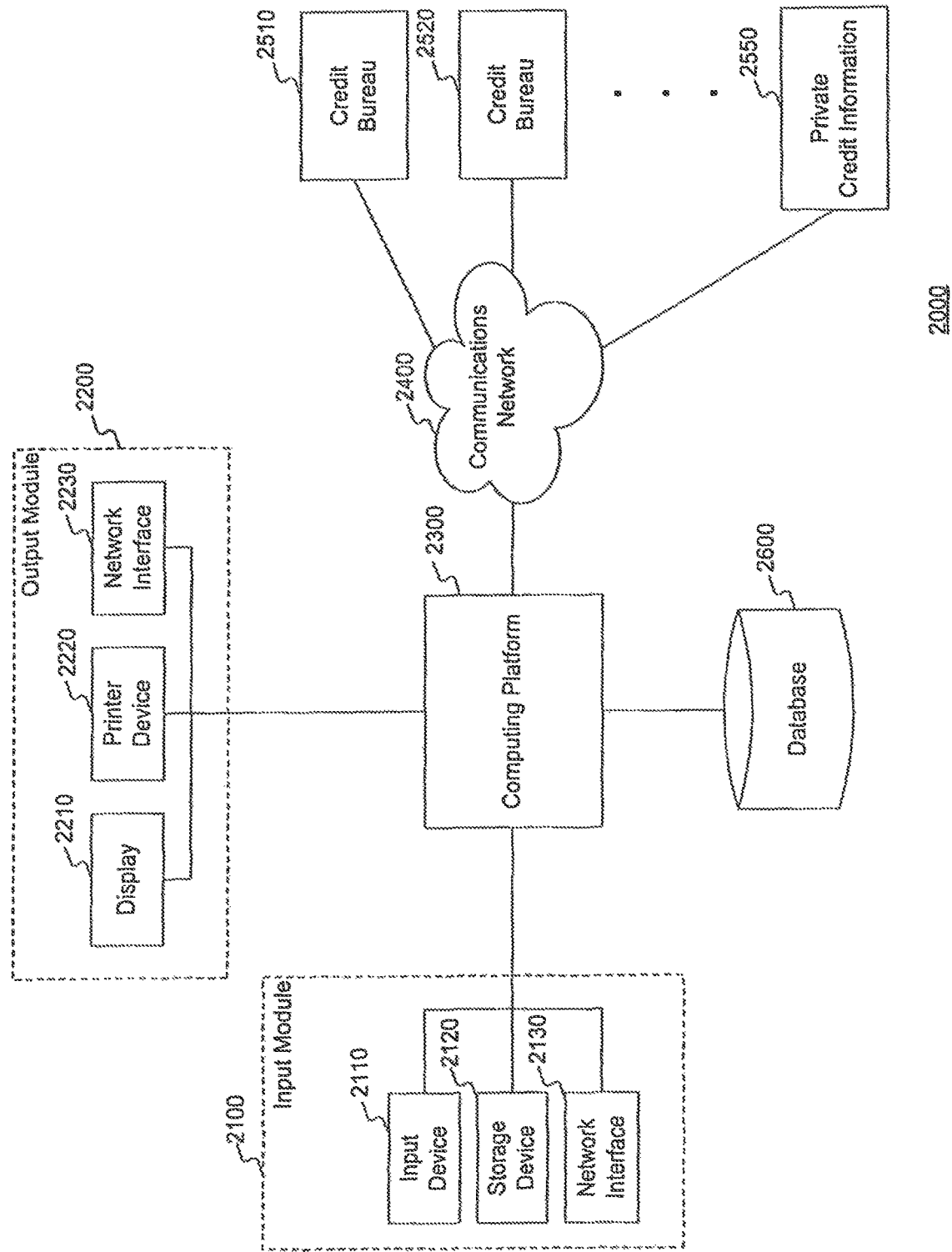
FIG. 2 illustrates another exemplary system environment in which the features of the present invention may be implemented.

FIG. 2 illustrates another exemplary system environment 2000 in which the features and principles of the present invention may be implemented. For purposes of illustration, the embodiment of FIG. 2 will generally be described below with reference to a dual line credit card. It will be apparent from the following description, however, that FIG. 2 may be implemented with other types of credit cards according to the invention, such as credit cards with embedded credit line(s). Therefore, the term "dual line credit card" should not be viewed as a term of limitation, but rather a term of illustration.

As illustrated in FIG. 2, system environment 2000 includes an input module 2100, an output module 2200, a computing platform 2300, a database 2600, one or more sources of credit information 2510-2550 that may be accessed through a communications network 2400. In the embodiment of FIG. 2, computing platform 2300 preferably comprises a data processor such as a PC or mainframe computer for performing various functions and operations of the invention. Computing platform 2300 may be implemented, for example, by a general purpose computer or processor selectively activated or reconfigured by a computer program stored in the computer, or may be a specially constructed computing platform for carrying-out the features and operations of the present invention. Computing platform 2300 may also be implemented or provided with a wide variety of components or subsystems including, for example, one or more of the following: one or more central processing units, a co-processor, memory, registers, and other data processing devices and subsystems.

Communications network 2400 may comprise, alone or in any suitable combination, a telephony-based network, a local area network (LAN), a wide area network (WAN), a dedicated intranet, the Internet, or a wireless network. Further, any suitable combination of wired and/or wireless components and systems may be incorporated into communications network 2400. Although the computing platform 2300 preferably connects to the one or more sources of credit information 2510-2550 through communications network 2400 (as illustrated in FIG. 2), computing platform 2300 may connect directly to one or more sources of credit information 2510-2550.

Computing platform 2300 also communicates or exchanges to and from input module 2100 and/or output module 2200 through the use of direct connections or communication links, as illustrated in FIG. 2. Alternatively, communication between computing platform 2300 and input module 2100 and/or output module 2200 may be achieved through the use of a network (not shown) similar to that described above for communications network 2400. By using dedicated communication links or a network, computing platform 2300 may be located in the same location or at a geographically separate location from input module 2100 and/or output module 2200.

Input module 2100 of system environment 2000 may be implemented with a wide variety of devices to receive and/or provide data (e.g., customer information, credit information, purchase information, authorization information, and/or settlement information) as input to computing platform 2300. As illustrated in FIG. 2, input module 2100 includes an input device 2110, a storage device 2120, and/or a network interface 2130. Input device 2110 may also comprise a keyboard, a mouse, a disk drive, a telephone, a credit card reader or swipe device, or any other suitable input device for providing data to computing platform 2300. Although FIG. 2 only illustrates a single input module 2100, a plurality of input modules 2100 may be used without departing from the spirit of the present invention.

Storage device 2120 may be implemented with a wide variety of systems, subsystems, and/or devices for providing memory or storage including, for example, one or more of the following: a read-only memory (ROM) device, a random access memory (RAM) device, a tape or disk drive, an optical storage device, a magnetic storage device, a RAID system (redundant array of inexpensive disks), and or any other device capable of providing storage and or memory for data associated with the present invention.

Network interface 2130, as illustrated in FIG. 2, exchanges data between input module 2100 and computing platform 2300. According to one aspect of the present invention, network interface 2130 permits connection to at least one or more of the following networks: an Ethernet network, an Internet Protocol network, a telephone network, a cellular network, a radio network, or any other network capable of being connected to the input module 2100.

As illustrated in FIG. 2, output module 2200 includes a display 2210, a printer device 2220, and/or a network interface 2230 for receiving the results provided as output from computing module 2200. The output module 2200 may generate one or more of the following outputs: mailing lists of potential cardholders of the dual line credit card, credit risk scores for potential cardholders, private label credit limits for potential cardholders, general credit limits for potential cardholders, authorization numbers for purchases made using the dual line credit card, and settlement information for using the dual line credit card. Although FIG. 2 only illustrates a single output module 2200, a plurality of spatially separated output modules 2200 may be used without departing from the spirit of the present invention. The output from computing platform 2300 may be displayed or viewed through display 2210 (e.g., a cathode ray tube or liquid crystal display) and/or printer device 2220.

Network interface 2230 exchanges data over a network between the output module 2200 and the computing platform 2300. The network interface 2230 may permit connection to at least one or more of the following networks: an Ethernet network, an Internet Protocol network, a telephone network, a cellular network, a radio network, or any other network capable of being connected to output module 2200.

The sources of credit information 2510-2550 may include credit history information that may be accessed and analyzed based on models from commercially available sources (e.g., the FICO model from Fair, Isaac and Company, Inc.) and credit information that may be accessed from financial clearinghouses or credit bureaus (e.g., TRW/Experian, Equifax and TransUnion). In addition, private information sources may be provided to gather private credit information to determine whether a potential cardholder qualifies for the dual line credit card. The private credit information includes, for example, purchasing habits with a merchant, payment history with the merchant, and other information to determine the risk associated with the potential cardholder.

The database 2600 contains various information including credit information, potential cardholder lists, risk scores for potential cardholders, approved cardholders, private label credit limits for approved cardholders, general credit limits for approved cardholders, merchant identification numbers, customer information, purchase information, authorization information, and/or settlement information.

Figure 3A:
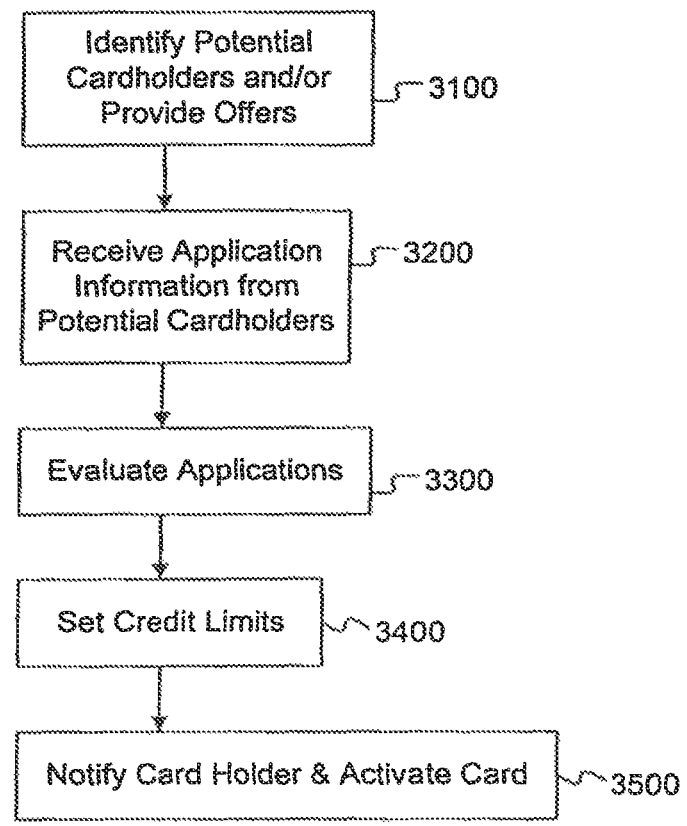
FIGS. 3A and 3B are exemplary flowcharts for providing a credit card and authorizing charges to the credit card, in accordance with the present invention.
Figure 3B:
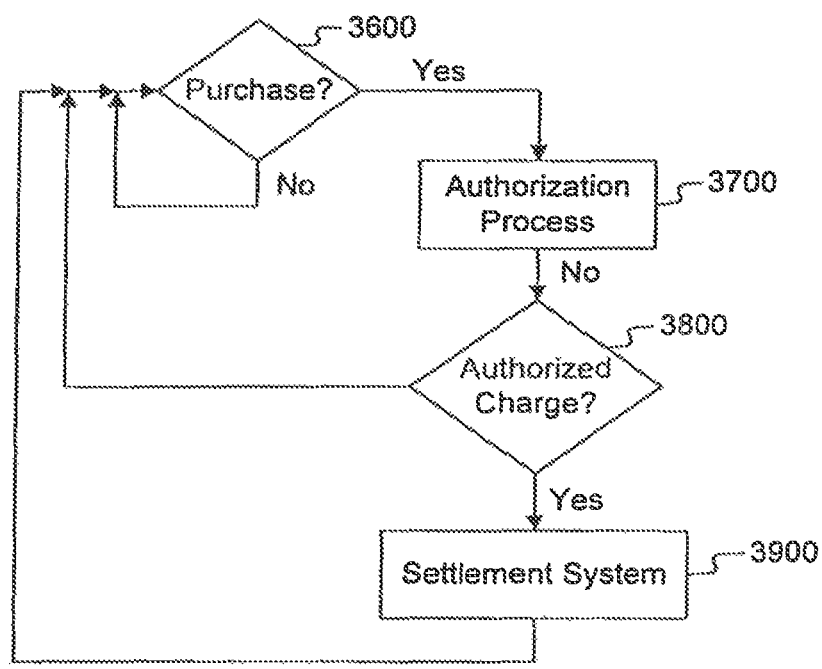

FIGS. 3A and 3B illustrate exemplary flow charts of processes and operations associated with issuing and handling charges with credit cards, in accordance with the present invention. For purposes of illustration, FIGS. 3A and 3B will generally be described below with reference to a dual line credit card. It will be apparent from the following description, however, that the features of FIGS. 3A and 3B may be implemented with other types of credit cards according to the invention, such as credit cards with embedded credit line(s). Therefore, the term "dual line credit card" should not be viewed as a term of limitation, but rather a term of illustration.

As shown in FIG. 3A, the process begins with each potential cardholder for the credit card (such as a dual line credit card) being identified and provided with an offer to apply for the credit card (step 3100). Each offer may include an invitation to obtain, for example, a dual line credit card. Input module 2100 may receive applications for the dual line credit card from each potential cardholder (step 3200). When an application is received, the application Information may be transferred to computing platform 2300 for evaluation (step 3300). Computing platform 2300 sets the credit limits for the dual line credit card (step 3400) for the potential cardholder, notifies the potential cardholder of acceptance and activates the dual line credit card (step 3500). After activation, the cardholder may use the dual line credit card to make purchases from merchants.

As illustrated in FIG. 3B, when a cardholder of the dual line credit card makes a purchase with a merchant (step 3600; Yes), the merchant may seek authorization for the purchase from the credit card issuer (step 3700). The authorization process may be implemented using, for example, input module 2100 to provide various information (e.g., purchase amount, BIN number, merchant identification number) to computing platform 2300. During the authorization process, computing platform 2300 may determine what credit line (e.g., the general purpose credit line or the private label credit line) the purchase is to be applied against. Computing platform 2300 may also determine if there is sufficient credit to authorize the charge. If the purchase is authorized (step 3800; Yes), the merchant may settle the amount of the purchase made (step 3900). Settlement may be achieved using, for example, input module 2100 and by posting the purchase amount to the appropriate credit line of cardholder's credit card. If the charge is not authorized (step 3800; No), then notification may be sent to the merchant to deny the purchase and the process returns to step 3600 to process the next attempted purchase by the cardholder.

To identify potential cardholders (step 3100), system 2000 may compose or generate a list of potential cardholders. Such a list may include preapproved or non-preapproved cardholders. Various approaches may be used to identify cardholders for the dual line credit card including, for example, in store credit card applications, inserts in catalogs, advertising on the Internet, direct mail to potential cardholders, direct response television (e.g., "infomercial"), and other sources of identifying potential cardholders. In the embodiment of FIG. 2, output module 2200 may generate various output to facilitate identifying non-preapproved potential cardholders for the dual line credit card including, for example, printing applications, printing catalogs, and printing direct mail literature, using, for example, printer device 2220. Moreover, network interface 2230 may connect to the Internet in order to permit applications for the dual line credit card over the Internet through, for example, a Web site.

Step 3100 of FIG. 3A may also include generating a list of preapproved potential cardholders. To identify preapproved potential cardholders, system 2000 may use a variety of customer lists to identify potential cardholders. In particular, computing platform 2300 may access credit information 2510-2550 through communications network 2400 to identify potential cardholders that may pre-qualify for the dual line credit card based on their credit history. According to one aspect of the present invention, computing platform 2300 may identify potential cardholders by assessing the risk of non-payment for each potential cardholder. This may be performed by generating and/or evaluating a risk score for each potential cardholder. Computing platform 2300 may also provide an invitation or solicitation for the dual line credit card to the potential cardholder using output module 2200. Moreover, network interface 2230 may connect to a Web server to permit potential cardholders to submit for a dual line credit card over the Internet.

As illustrated in FIG. 3A, potential cardholders may respond to offers by providing application information for the dual line credit card (step 3200). The application information may be entered or provided to system 2000 through input module 2100 by using input device 2110. The potential cardholder may provide application information including, for example, name, address, social security number, date of birth, home telephone number, number of people in household, length of time living at present address, monthly house payment, current employer, owner or renter of residence, gross annual income, retirement status, current employer, current business telephone number, length of employment, and mother's maiden name. Furthermore, the offer or application may identify the merchant associated with the private label credit line. The application information may be provided by the potential cardholder or may be forwarded by the merchant (or a customer call center) seeking to provide the dual line credit card to one of the merchant's customers.

To evaluate application information for the dual line credit card (step 3300), various sources of information may be used including, for example, credit bureau information and private credit information to determine the potential cardholder's risk of non-payment. Such information may be used to generate a risk score that is indicative of the credit worthiness of the potential cardholder. This information may also be used to determine and establish the various lines of credit associated with the dual line credit card, as further described below.

Figure 4:
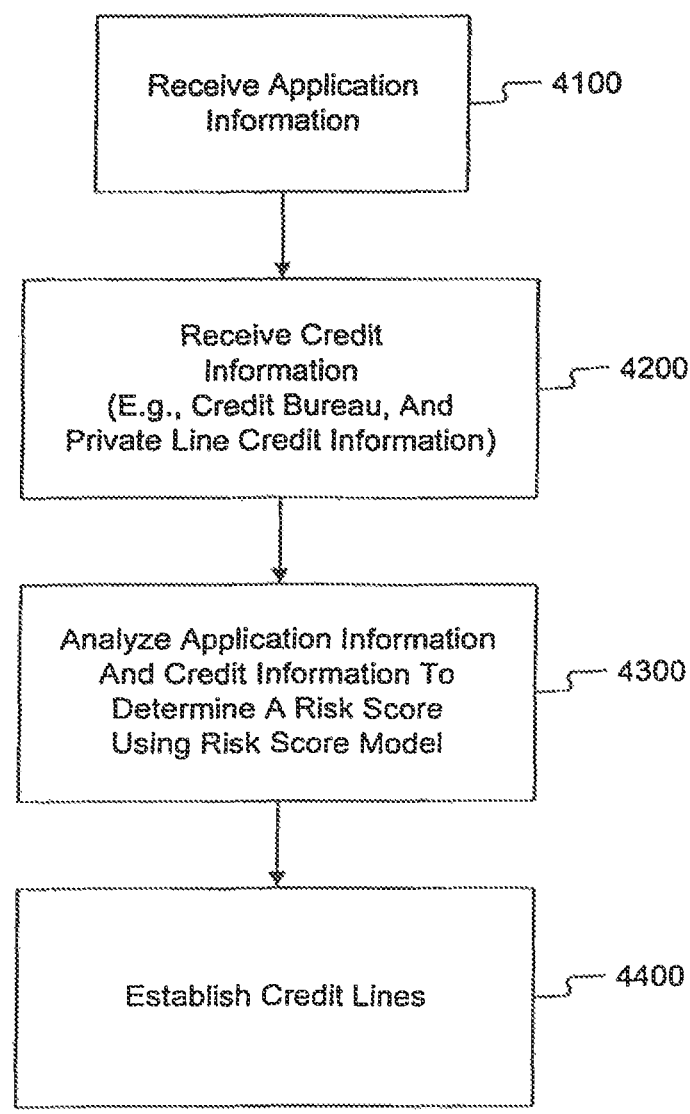
FIG. 4 is another exemplary flowchart for providing a credit card, in accordance with the present invention.

FIG. 4 is an exemplary flowchart illustrating the features and operations that may be implemented for receiving applications from potential cardholders, evaluating the application information, and setting a credit limit for the general purpose credit line and private label credit line. The features of FIG. 4 may be implemented in connection with the credit card of the present invention, including dual line credit cards and credit cards with embedded credit line(s). For purpose of illustration, FIG. 4 will be described below with reference to a dual line credit card. FIG. 4, however, may also be implemented in connection with credit cards including embedded credit lines.

As illustrated in FIG. 4, application information is received (step 4100) for the potential cardholder input module 2100. Once input module 2100 receives the application Information, computing platform 2300 gathers credit information (step 4200) for the potential cardholder from various sources including, for example, one or more credit bureaus 2510, 2520 and/or private credit information sources 2550. Computing platform 2300 stores the received credit information and the received application Information in database 2600.

To analyze application information (step 4300), computing platform 2300 may analyze the application information and the credit information for the potential cardholder to determine the potential cardholder's risk of non-payment. The potential cardholder's risk of non-payment may be represented by a risk score that assigns, for example, a high risk score to a potential cardholder that has a high risk of non-payment and that assigns a low risk score to a potential cardholder that has a low risk of non-payment. The risk score for each potential cardholder may be generated using various types of risk score models. The risk score model may be a risk score model that is standardized and/or commercially available (e.g., such as the FICO model from Fair, Isaac and Company, Inc.) or may be customized risk score model.

To establish the credit lines for the credit card (step 4400), computing platform 2300 may utilize the potential cardholder's credit history information and/or risk score. For example, computing platform 2300 may use the level or risk associated with the potential cardholder to establish a general purpose credit line. Computing platform 2300 may also establish a private label credit line based on the level of risk associated with the potential cardholder. For example, computing platform 2300 may give a potential cardholder with a relatively large risk score a lower credit limit (i.e., for the general purpose credit line and/or for the private label credit line) and/or a higher interest rate when compared to a potential cardholder with a lower risk score.

As indicated above, the credit card issuer may utilize a risk score to establish the general purpose credit line for the cardholder. In addition, the credit card issuer may establish the private label credit line based on one or more factors, including for example: the risk score of the cardholder; the types of goods and/or services provided by the merchant associated with the private label credit line; and the average or expected purchase amount of good and/or services purchased from the merchant. Such factors may be applied in various ways (including the use of the line sloping model discussed below) to determine and set the private label credit line. Other factors (such as purchasing habits of the cardholder, the credit history of the cardholder with the merchant, and the credit limit established for the general purpose credit line) may be used by the credit card issuer to set the private label credit line.

By way of non-limiting example, the computing platform 2300 may utilize a line sloping model to establish the general purpose credit line and the private label credit line for cardholders with varying degrees of risk. Table 1 illustrates an exemplary line sloping model in accordance with the present invention. Referring to Table 1, when computing platform 2300 calculates a risk score that indicates a credit line of $200, computing platform 2300 utilizes the exemplary line sloping model of Table 1 to establish the private label credit line at $200 and establish the general purpose credit line at $200. When computing platform 2300 calculates a risk score that indicates a credit line of $1800, computing platform 2300 utilizes the exemplary line sloping model of Table 1 to establish the private label credit line at $500 and establish the general purpose credit line at $1800. When computing platform 2300 calculates a risk score that indicates a credit line of $3000, computing platform 2300 utilizes the exemplary line sloping model of Table 1 to establish the private label credit line at $1000 and a general purpose credit line at $3000. Accordingly, the potential cardholder with a higher risk of non-payment would be provided with a smaller general purpose credit line and a smaller private label credit line. Although Table 1 illustrates an exemplary line sloping model, various line slope models may be used in accordance with the present invention.

TABLE 1

Exemplary Line Sloping Model

| CREDIT LINE BASED ON RISK SCORE | GENERAL PURPOSE CREDIT LINE | PRIVATE LABEL CREDIT LINE |
|---|---|---|
| less than $1000 | less than $1000 | $200 |
| $1000-$2000 | $1000-$2000 | $500 |
| $2000-$5000 | $2000-$5000 | $1000 |
| $5000 or more | $5000 or more | $2000 |

By way of another non-limiting example, credit card issuer 1400 may issue a credit card with a main credit line and one or more embedded credit lines to cardholders 1100, 1200. With the credit cards with embedded credit lines, computing platform 2300 calculates a risk score that indicates a general purpose credit line of $10,000 (see, e.g., Table 1 at the last row), computing platform 2300 utilizes the exemplary line sloping model of Table 1 to establish the main credit line at $12,000. This would permit the cardholder to make up to $12,000 in private label purchases, or up to $10,000 general purpose purchases and up to $2,000 private label purchases.

To set the credit lines for a dual line credit card, the computing platform 2300 may also establish a general purpose credit line that is set to a first dollar amount and establish a private label credit line that is set to a second dollar amount that is a ratio of or related to the first dollar amount set for the general purpose credit line. Alternatively, the dual line credit card may be established with two lines of credit, with the private label credit line representing a maximum credit limit and with the general purpose credit line representing a part of, or embedded within, the private label credit line. When the general purpose credit line is a part of the private label credit line, the general purpose credit line reduces the amount available under the private label credit line by the amount charged under the general purpose credit line.

Referring again to FIG. 3A, when computing platform 2300 establishes the general purpose credit line and the private label credit line (step 3400), computing platform 2300 may notify cardholder by, for example, printing and/or sending a notification to the cardholder using printer device 2220, and/or sending the potential cardholder an e-mail through network interface 2230 (step 3500).

To activate the dual line credit card after notification (step 3500), the cardholder may activate the card (step 3500) by, for example, sending an e-mail through network interface 2130 to computing platform 2300 or by making a telephone call to a customer call center that inputs the activation information on input device 1110 for transfer to computing platform 2300. The computing platform 2300 stores the dual line credit card information and merchant identification number in database 2600. With the dual line credit card activated, the potential cardholder becomes a cardholder of the dual line credit card. Accordingly, the cardholder of the dual line credit card may utilize the general purpose credit line or private label credit line to make purchases. Moreover, since the private label credit line and the general purpose credit line are both revolving credit lines, the cardholder will be provided with more flexibility and convenience for making purchases. To make such a purchase (FIG. 3B, step 3600), the cardholder may request a merchant to make the purchase and the dual line credit card. Such a transaction may be performed on-line through a merchant's Web site or may be conducted in-person at a merchant's store. Thereafter, the merchant may seek authorization to charge the amount of the purchase to the dual line credit card (step 3700).

Figure 5:
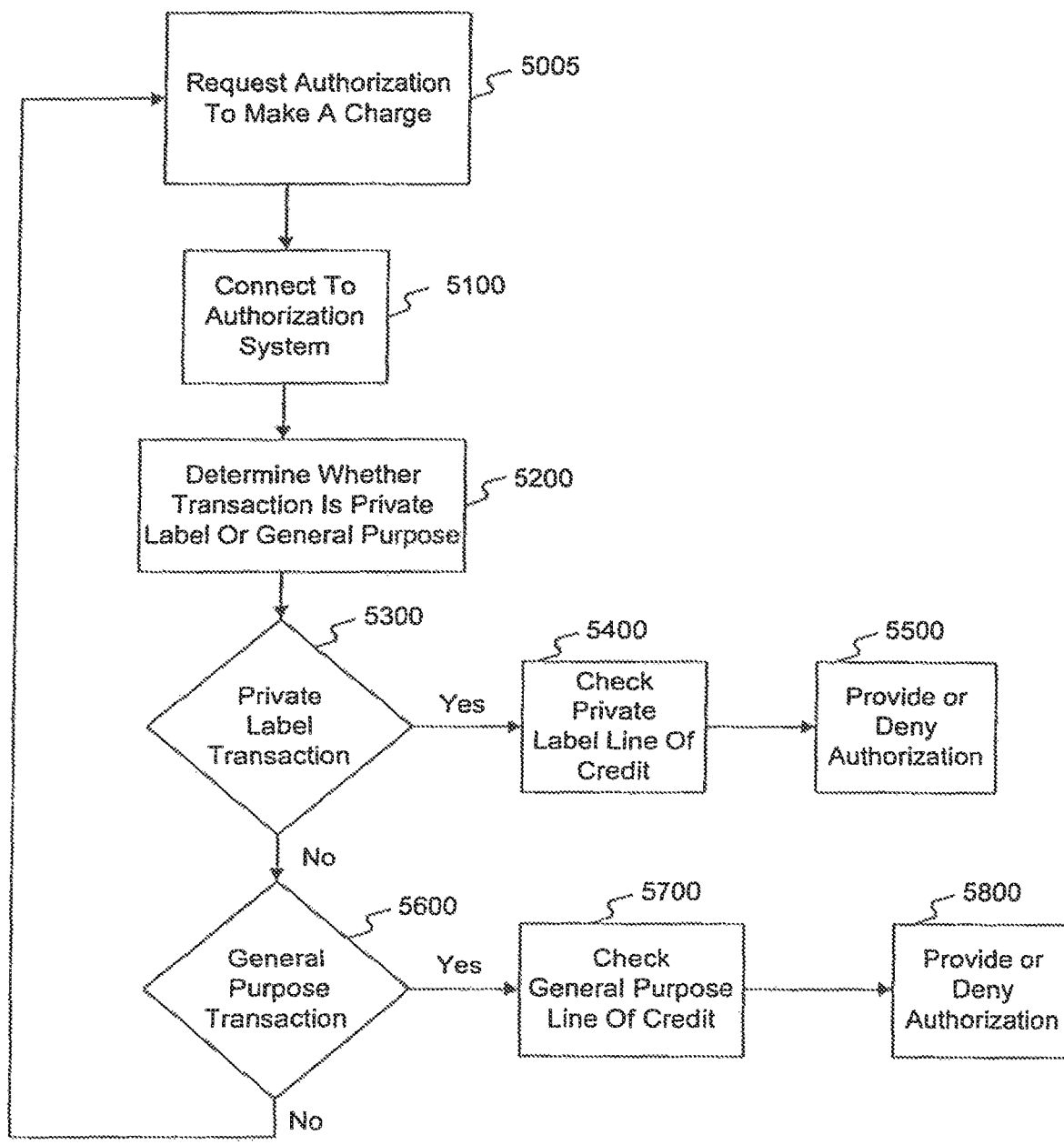
FIG. 5 is another exemplary flowchart for authorizing a charge made with a credit card, in accordance with the present invention.

FIG. 5 illustrates an exemplary process associated with authorizing a charge made with a credit card, in accordance with the present invention. The features of FIG. 5 may be implemented in connection with credit cards of the present invention, including dual line credit cards and credit cards with embedded credit line(s). For purpose of illustration, FIG. 5 will be described below with reference to a dual line credit card. FIG. 5, however, may also be implemented in connection with credit cards including embedded credit lines and other types of credit cards with multiple lines of credit.

Referring to FIG. 5, a merchant may request authorization for a charge to the dual line credit card (step 5005). Such a charge may be made by a cardholder in connection with a purchase for goods and/or service from the merchant. When such a purchase is made with the dual line credit card of the cardholder, the merchant may send various information to the credit card issuer or a bank (handling transactions for the credit card issuer. As indicated above, the information sent from the merchant may include, for example, the purchase amount, the BIN number (i.e., the first six digits of the dual line credit card or the credit card account number) and the merchant identification number. With reference to the embodiment of FIG. 2, this information may be entered using, for example, input device 2110. Input device 2110 may connect to a credit card authorization system for the credit card (step 5100) through network interface 2130 to access the computing platform 2300 and data base 2600. Once connected, input device 2110 provides computing platform 2300 and data base 2600 with the BIN number, the merchant's identification number, and the purchase amount.

To determine whether the purchase is against the private label credit line or general purpose credit line (step 5200), computing platform 2300 evaluates the received BIN number and merchant identification number from the merchant. For example, computing platform 2300 may use the received BIN number to retrieve the account record for the cardholder from data base 2600. With the cardholder's account record, computing platform 2300 may evaluate the account record information to determine what credit lines are established for the cardholder's credit card. If it is confirmed that a private label credit line exists for the cardholder's credit card, then computing platform 2300 may compare the received merchant identification number from the merchant with valid merchant identification number(s) stored in the cardholder's account record for the private label credit line. Alternatively, computing platform 2300 may compare the received merchant identification number from the merchant with merchant identification number(s) stored in a master record of valid merchant identification numbers stored in database 2600. If the received merchant identification number corresponds to a valid merchant identification number stored in data base 2600 for the cardholder's private label credit line, then the transaction may be identified as a private label transaction or purchase against the private label credit line of the credit card (step 5300; Yes). If the received merchant identification number does not correspond to a merchant identification stored in the data base 2600, then the purchase is not a private label credit line purchase (step 5300; No).

When purchase is not a private label transaction (step 5300; No), computing platform 2300 may determine whether the purchase is a valid a general purpose transaction (step 5600). To determine if the transaction is a valid general purchase transaction, computing platform 2300 may again use the received BIN number to retrieve and analyze the account record for the cardholder from data base 2600. With the cardholders account record, computing platform 2300 may evaluate the account record information to determine if a general purpose credit line is established for the cardholder's credit card. If it is confirmed that a general purpose credit line exists for the cardholder's credit card, then computing platform 2300 may confirm that the purchase is a general purpose transaction (step 5600: Yes).

As part of step 5600 in FIG. 5, computing platform may compare the received merchant identification number from the merchant with valid merchant identification number(s) stored in the cardholder's account record for the general purpose credit line. Alternatively, computing platform 2300 may compare the received merchant identification number from the merchant with merchant identification number(s) stored in a master record of valid merchant identification numbers stored in database 2600. If the received merchant identification number corresponds to a valid merchant identification number stored in data base 2600 for the cardholder's general purpose credit line, then the transaction may identified as a general purpose transaction or purchase against the general purpose credit line of the credit card (step 5600; Yes).

If a general purpose credit line does not exist for the cardholder's credit card and/or if the received merchant identification number does not correspond to a merchant identification stored in the data base 2600, then the purchase is not a qualifying general purpose credit line purchase (step 5600; No) and the process returns to step 5005 to wait and/or process the next authorization request.

When the purchase corresponds to a private label transaction (step 5300; Yes), computing platform 2300 checks or compares the amount of available credit in the private label credit line (i.e., stored in the cardholder's account record in database 2600) to the purchase amount (step 5400). If the amount of available credit for the private label credit line is sufficient for the purchase amount, computing platform 2300 provides an authorization for the purchase (step 5500) through, for example, output module 2200. The authorization from the computing platform 2300 may include an authorization or tracking number for the transaction. The merchant then receives the authorization for the purchase and completes the sale with the cardholder. If the amount of available credit in the private label credit line is insufficient for the purchase amount, computing platform 2300 may deny authorization for the purchase (step 5500) through, for example, output module 2200. If computing platform 2300 provides an indication that the authorization is denied, the merchant may void the sale and prevent the cardholder from completing the purchase using the dual line credit card.

As part of step 5400, computing platform 2300 may check alternate credit lines when it is determined that there is insufficient credit for the purchase against the private label credit line. For example, the process may loop from step 5400 to step 5600 if it is determined that there is insufficient credit for the private label transaction. At step 5600, computing platform 2300 would then determine if the purchase could be charged against the general purpose credit line of the dual line credit card in order to provide authorization to the merchant. As such, even though insufficient credit exists for the private label credit line, the purchase with merchant could still be completed if sufficient credit exists with the general purpose credit line of the cardholder's credit card.

When the purchase corresponds to a transaction against the general purpose line of credit (step 5600; Yes), computing platform 2300 compares the amount of available credit in the general purpose credit line (i.e., stored in database 2600) to the purchase amount (step 5700). If the amount of available credit in the general purpose credit line is sufficient for the purchase amount, computing platform 2300 provides an authorization for the purchase (step 5800) through, for example, output module 2200. The authorization from the computing platform 2300 may include an authorization or tracking number for the transaction. The merchant then receives the authorization and permits the cardholder to complete the purchase. If the amount of available credit in the general purpose credit line is insufficient for the purchase amount, computing platform 2300 may deny authorization for the purchase (step 5800) through, for example, output module 2200. The merchant would then receive the denial for authorization and prevent the cardholder from completing the purchase.

Accordingly, system 2000 of FIG. 2 provides the merchant with authorization to make charges against the cardholder's general purpose credit line or the private label credit line. The features of the dual line credit card of the present invention, therefore, eliminate the need for using two distinct credit cards (i.e., one for general purpose transactions or purchases and one for private label transactions). Although computing platform 2300 may authorize purchases made with the dual line credit card, other credit card settlement systems (not shown) may be used to authorize purchases made without departing from the spirit and teachings of the present invention.

Referring again to FIG. 3A, once the merchant receives authorization (step 3700), the cardholder may complete the purchase with the merchant. After the purchase is made with the cardholder's credit card, the merchant may seek settlement (step 3900) for the purchase made by the cardholder.

Figure 6:
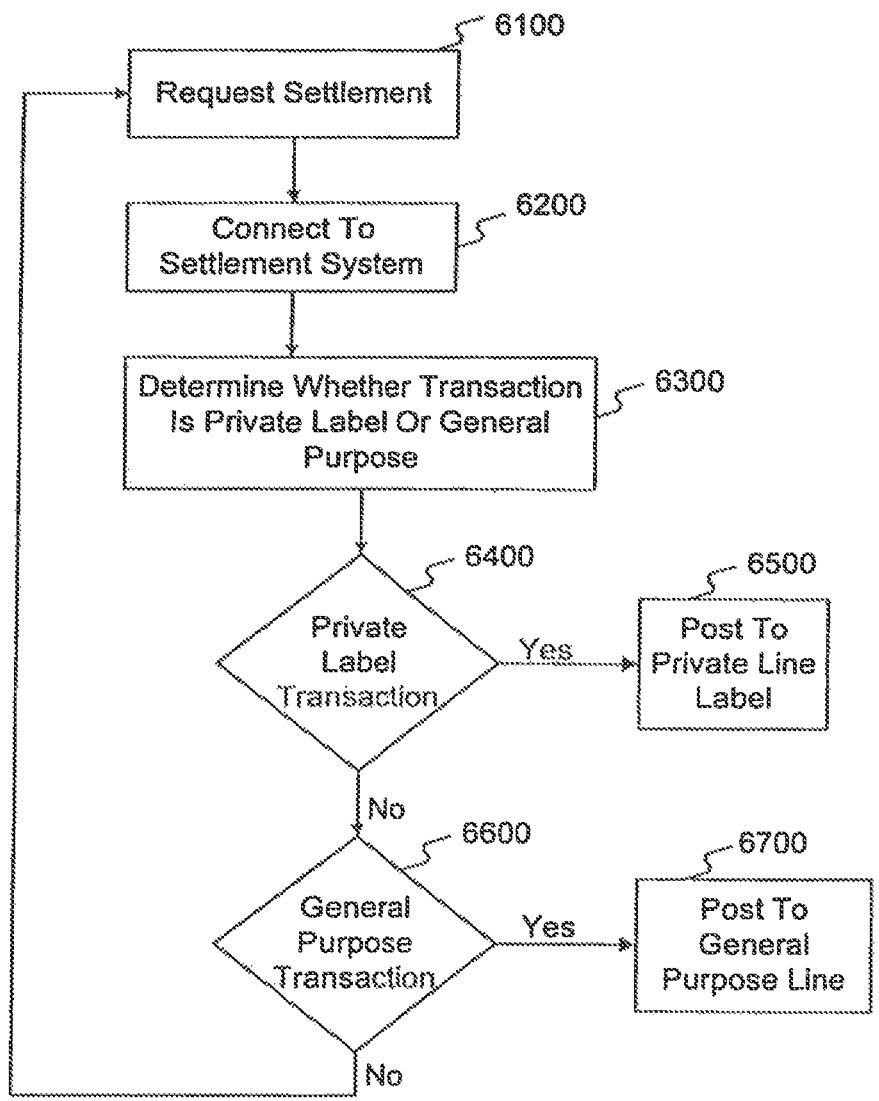
FIG. 6 is an exemplary flowchart for settling a charge made with a credit card, in accordance with the present invention.

FIG. 6 illustrates an exemplary process for settling charges made with a credit card, in accordance with the present invention. The features of FIG. 6 may be implemented in connection with credit cards of the present invention, including dual line credit cards and credit cards with embedded credit line(s). For purpose of illustration, FIG. 6 will be described below with reference to a dual line credit card. FIG. 6, however, may also be implemented in connection with credit cards including embedded credit lines and other types of credit card with multiple lines of credit.

Referring to FIG. 6, a merchant may request settlement (step 6100) after an authorized purchase has been made by a cardholder. The merchant may request settlement by sending, for example, purchase information previously stored on storage device 2120 through network interface 2130 to computing platform 2300 (step 6200). Once connected, computing platform 2300 receives all of the purchase information, including, for example, the BIN number of the dual line credit card (i.e., the first six numbers of the dual line credit card or the credit card account number), the merchant identification number, the purchase amount, and/or authorization number provided to the merchant during authorization. Although the exemplary embodiment utilizes computing platform 2300 for settlement of the purchase, other credit card settlement systems (not shown) may be used, such as settlement systems that are provided by banks, merchant banks, and/or other financial institutions.

To determine whether the purchase is to be posted against the private label credit line or general purpose credit line (step 6300), computing platform 2300 may use various techniques. For example, if the type of purchase (private label or general purpose) was recorded in data base 2600 when authorization was granted, computing platform may use the received BIN number and/or the authorization number to determine the transaction type form the transaction information recorded in data base 2600 (steps 6400 and 6600). Alternatively, computing platform 2300 may retrieve the cardholder's account record based on the received BIN number and compare the received merchant identification number with the stored merchant identification number(s) to determine if the merchant is a valid merchant corresponding to the private label credit line. If the received merchant identification number corresponds to a valid merchant identification number for the private label credit line, the transaction is a private label transaction (step 6400; Yes). If the received merchant identification does not correspond to a valid private label merchant identification stored in the data base 2600, the purchase may default to a general purpose transaction (step 6600; Yes) or computing platform 2300 may further compare the received merchant identification number with stored merchant identification numbers to determine if the purchase is a general purpose transaction, as described above for FIG. 5 (see step 5600).

When the purchase corresponds to a private label transaction (step 6400; Yes), computing platform 2300 posts the purchase amount against the available credit in the private label credit line (step 6500) and updates the cardholder's account record stored in database 2600. By way of non-limiting example, if the cardholder makes a $500 purchase against the private label credit line with an available balance of $5,000, computing platform 2300 posts the $500 private label purchase against the private label credit line, which leaves the cardholder with $4,500 as the available balance in the private label credit line. Computing platform 2300 also credits the merchant with the amount posted to the cardholder's dual line credit card account. Computing platform 2300 may also debit the merchant with the amount posted to the cardholder's dual line credit card account, when the cardholder returns a purchase and seeks a credit.

When the purchase corresponds to a transaction against the general purpose credit line (step 6600; Yes), computing platform 2300 posts a the purchase amount against the available credit in the general purpose credit line (step 6700) and updates the cardholder's account record stored in database 2600. Computing platform 2300 also makes the appropriate credit or debit to the merchant. By way of non-limiting example, if the cardholder makes a $800 purchase against the general purpose credit line with an available balance of $7,000, computing platform 2300 posts the $800 general purpose purchase against the general purpose credit line, which leaves the cardholder with $6,200 as the available balance in the general purpose credit line.

As indicated above, the disclosed embodiments may be implemented for various types of credit cards with multiple lines of credit, including the dual line credit card of the present invention. For example, the above-described embodiments of FIGS. 5 and 6 may be implemented for use with credit card with embedded credit line(s). Assume, for example, that a credit card is issued with a main credit line of $10,000 and with a $8,000 general purpose credit line that is an embedded credit line.

Referring to FIG. 5, the merchant requests authorization (step 5005) and connects to the authorization system (step 5100) as describe above. During authorization using the embedded credit card, the steps of FIG. 5 are similar to those described above. However, the computing platform 2300 treats the main credit line of the embedded credit card as it would the private label credit line of FIG. 5 (as described above). Accordingly, computing platform 2300 evaluates the received BIN number and merchant identification number from the merchant to determine whether the purchase is against the general purpose credit line or the main credit line (i.e., the private label credit line of FIG. 5) (step 5200). The computing platform 2300 then proceeds to execute the remaining steps of FIG. 5 (steps 5300-5800). In this example, the computing platform would authorize a private transaction against the $10,000 main credit line or authorize a general purpose transaction against the $8000 general purpose credit line that is embedded within the main credit line.

Referring again to FIG. 6, the merchant requests settlement (step 6100) and connects to the settlement system (step 6100) as describe above. During settlement with the embedded credit card, the computing platform 2300 of the embedded credit card as it would the private label credit line of FIG. 6 (as described above). The computing platform 2300 thus determines whether the transaction is against the general purpose credit line or the main credit line (i.e., the private label credit line of FIG. 6). If the purchase is against the main line credit line (step 6400; Yes), the computing platform posts the purchase amount to the cardholders main credit line. If the purchase is against the general purpose credit line, the computing platform 2300 posts the purchase amount to the cardholders general purpose credit line. Since the embedded credit card includes one or more embedded lines of credit, the computing platform 2300 may also update the credit lines of the other embedded credit lines affected by the posting. For instance, when a purchase is posted to the general purpose credit line that is embedded within the main line credit line, the general purpose credit line is reduced by the purchase amount and the main line credit line is also reduced by the purchase amount.

The foregoing description of a preferred embodiments of the invention has been presented for purposes of illustration and description. It is not intended to be exhaustive or to limit the invention to the precise form disclosed, and modifications and variations are possible in light of the above teachings or may be acquired from practice of the invention. For example, the present invention is not limited to the system and methods disclosed, but is capable of being embodied in a variety of ways and services. In addition, although the dual line credit card is described in the foregoing as including two revolving lines of credit (e.g., a private label credit line and a general purpose credit line), one or more private label credit lines and one or more general purpose credit lines may be used with the dual line credit card without departing from the spirit of the present invention. Also, credit cards with multiple main credit lines may also be implemented according to the principles of the invention, wherein each main credit line has one or more embedded credit lines.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of authorizing, by a credit card issuer, a purchase made with a merchant using a credit card, wherein the credit card includes a general purpose credit line and a private label credit line, the method comprising:
   providing a credit card with a bank identification (BIN) number associated with a dual credit line credit card;
   determining a linked merchant identification number using the BIN number as an index;
   associating the linked merchant identification number with the credit card;
   receiving a request to authorize a purchase using the credit card, wherein the request includes a first merchant identification number and the BIN number;
   determining, based on the received BIN number, the credit card is a dual credit line credit card;
   comparing, based on the determination, the first merchant identification number to the linked merchant identification number associated with the credit card;
   determining, based on the comparison, the credit card is associated with the private label credit line and associated with the merchant;
   authorizing the purchase against the private label credit line based on the determination the credit card is associated with the private label credit line and associated with the merchant; and
   reducing an amount available in the private label credit limit and an amount available in the general purpose credit limit by an amount of the purchase.

2. The method of claim 1, further comprising utilizing the BIN number to retrieve an account record; and comparing the merchant identification number with a stored merchant identification number in the account record.

3. The method of claim 1, further comprising settling, with the merchant, the purchase made using the credit card.

4. The method of claim 3, wherein settling further comprising posting a credit to an account of the merchant.

5. The method of claim 3, wherein settling comprises analyzing an authorization number to determine if the transaction was private or general.

6. The method of claim 1, wherein the general purpose credit line is less than the private label credit line and a part of the private label credit line.

7. The method of claim 1, further comprising settling an amount available in the private label credit line that is proportional to an amount available of the general purpose credit line.

8. A computer-implemented method of authorizing, by a credit card issuer, a purchase made with a merchant using a credit card, wherein the credit card includes a general purpose credit line and a private label credit line, the method comprising:
   providing a credit card with a bank identification (BIN) number associated with a dual credit line credit card;
   determining a linked merchant identification number using the BIN number as an index;
   associating the linked merchant identification number with the credit card;
   receiving a request to authorize a purchase using the credit card, the request comprising a first merchant identification number and the BIN number;
   determining, based on the received BIN number, the credit card is a dual credit line credit card;
   comparing, based on the determination, the first merchant identification number to the linked merchant identification number associated with the credit card;
   determining, based on the comparison, the credit card is associated with the private label credit line and associated with the merchant;
   authorizing the purchase against the private label credit line based on the determination the credit card is associated with the private label credit line and associated with the merchant; and
   reducing an amount available in the private label credit limit and an amount available in the general purpose credit limit by an amount of the purchase.

9. The method of claim 8, further comprising for utilizing the BIN number to retrieve an account record; and comparing the merchant identification number with a stored merchant identification number in the account record.

10. The method of claim 8, further comprising settling, with the, merchant, the purchase made using the credit card.

11. The method of claim 10, further comprising posting a credit to an account of the merchant.

12. The method of claim 10, wherein settling further comprises analyzing an authorization number to determine if the transaction was private or general.

13. The method of claim 8, wherein the general purpose credit line is less than the private label credit line and proportional to the private label credit line.

14. The method of claim 8, further comprising settling an amount available in the private label credit line that is proportional to an amount available of the general purpose credit line.

15. A method of authorizing, by a credit card issuer, a purchase made with a merchant using a credit card, the credit card being associated with a general purpose credit line and a private label credit line, the method comprising:
   providing a credit card with a bank identification (BIN) number associated with a dual credit line credit card;
   determining a linked merchant identification number using the BIN number as an index;
   associating the linked merchant identification number with the credit card;
   receiving a request to authorize a purchase using the credit card, the request comprising a first merchant identification number and the BIN number;
   determining, based on the received BIN number, the credit card is a dual credit line credit card;
   comparing, based on the determination, the first merchant identification number to the merchant identification number associated with the credit card;
   determining, based on the comparison, the credit card is associated with the private label credit line and associated with the merchant;
   determining that the private label credit line has insufficient funds to authorize the purchase;
   determining that the general purpose credit line has sufficient funds to authorize the purchase;
   authorizing the purchase against the general purpose credit line; and
   reducing an amount available in the general purpose credit limit and an amount available in the private label credit limit by an amount of the purchase.

16. The method of claim 15, further comprising utilizing the BIN number to retrieve an account record; and comparing the merchant identification number with a stored merchant identification number in the account record.

17. The method of claim 15, further comprising settling, with the merchant, the purchase made using the credit card.

18. The method of claim 17, wherein settling comprises analyzing an authorization number to determine whether the transaction was private or general.

19. The method of claim 15, wherein the general purpose credit line is less than the private label credit line and a part of the private label credit line.

20. The method of claim 15, further comprising settling an amount available in the private label credit line that is proportional to an amount available in the general purpose credit line.

* * * * *